(12) United States Patent
Phung et al.

(10) Patent No.: US 11,463,463 B1
(45) Date of Patent: Oct. 4, 2022

(54) SYSTEMS AND METHODS FOR IDENTIFYING SECURITY RISKS POSED BY APPLICATION BUNDLES

(71) Applicant: Symantec Corporation, Mountain View, CA (US)

(72) Inventors: Ben Phung, Culver City, CA (US); Movses Margaryan, Culver, CA (US); Joshua Opos, Culver City, UT (US)

(73) Assignee: NortonLifeLock Inc., Tempe, AZ (US)

( * ) Notice: Subject to any disclaimer, the term of this patent is extended or adjusted under 35 U.S.C. 154(b) by 236 days.

(21) Appl. No.: 16/723,397

(22) Filed: Dec. 20, 2019

(51) Int. Cl.
  *H04L 9/40* (2022.01)
(52) U.S. Cl.
  CPC ...... *H04L 63/1425* (2013.01); *H04L 63/0272* (2013.01); *H04L 63/1433* (2013.01); *H04L 63/1483* (2013.01)
(58) Field of Classification Search
  CPC ............. H04L 63/1425; H04L 63/0272; H04L 63/1433; H04L 63/1482
  See application file for complete search history.

(56) References Cited

U.S. PATENT DOCUMENTS

| | | | | |
|---|---|---|---|---|
| 9,900,324 B1* | 2/2018 | Barua | ................. | H04L 63/1433 |
| 10,482,260 B1* | 11/2019 | Bettini | ................. | G06F 21/577 |
| 10,594,736 B1* | 3/2020 | Amit | ................. | H04L 63/14 |
| 10,938,743 B1* | 3/2021 | Andrews | ................. | H04L 47/76 |
| 10,972,503 B1* | 4/2021 | Mohan | ................. | H04L 63/1491 |
| 11,005,867 B1* | 5/2021 | Song | ................. | H04W 24/08 |
| 11,134,058 B1* | 9/2021 | Sole | ................. | H04L 63/10 |
| 2014/0165177 A1* | 6/2014 | Alagha | ................. | H04L 63/168 |
| | | | | 726/9 |

(Continued)

FOREIGN PATENT DOCUMENTS

| | | | | |
|---|---|---|---|---|
| CN | 110225009 A | * | 9/2019 | ......... H04L 63/0281 |
| WO | WO-2015024435 A1 | * | 2/2015 | .......... H04L 61/1511 |

OTHER PUBLICATIONS

Dunn, John E, "ZipperDown catches 16,000 iOS apps with their pants down", URL: https://nakedsecurity.sophos.com/2018/05/18/zipperdown-catches-16000-ios-apps-with-their-pants-down/, Naked Security, May 18, 2018, pp. 1-9.

(Continued)

*Primary Examiner* — Sarah Su
(74) *Attorney, Agent, or Firm* — FisherBroyles, LLP (57) ABSTRACT

The disclosed computer-implemented method for identifying security risks posed by application bundles may include (i) intercepting, using a VPN client of the computing device, network traffic of the computing device, wherein an operating system of the computing device restricts applications into a sandboxed environment, (ii) storing, on the computing device, a copy of at least a portion of the network traffic of the computing device within a sandbox associated with the VPN client, (iii) identifying, by analyzing the copy of the network traffic, an application bundle within the network traffic, (iv) determining, by analyzing the application bundle in the sandbox associated with the VPN client, that the application bundle poses a security risk, and (v) in response to determining that the application bundle poses a security risk, performing a security action to remedy the security risk. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2015/0067853 | A1* | 3/2015 | Amrutkar | H04L 63/1466 |
| | | | | 726/23 |
| 2016/0337104 | A1* | 11/2016 | Kalligudd | H04W 12/033 |
| 2017/0366562 | A1* | 12/2017 | Zhang | H04L 63/1433 |
| 2018/0300475 | A1* | 10/2018 | Zhang | H04L 63/0272 |
| 2019/0068641 | A1* | 2/2019 | Araujo | G06F 21/54 |
| 2020/0210579 | A1* | 7/2020 | Chen | G06F 8/60 |
| 2020/0314067 | A1* | 10/2020 | Rudnik | H04L 61/1511 |

OTHER PUBLICATIONS

Frohnhoefer, Eric, "Vulnerability in Twitter Kit for iOS", URL: https://blog.twitter.com/developer/en_us/topics/tips/2018/vulnerability-in-twitter-kit-for-ios.html, Apr. 26, 2019, pp. 1-2.

Github, "AFSSLPinningModeNone vulnerable to man-in-the-middle attacks", URL: https://github.com/AFNetworking/AFNetworking/issues/2619, Mar. 27, 2015, pp. 1-3.

Cimpanu, Catalin, "Two-thirds of iOS apps disable ATS, an iOS security feature", URL: https://www.zdnet.com/article/two-thirds-of-ios-apps-disable-ats-an-ios-security-feature/, ZDNet, Jun. 5, 2019, pp. 1-5.

\* cited by examiner

SYSTEMS AND METHODS FOR IDENTIFYING SECURITY RISKS POSED BY APPLICATION BUNDLES

BACKGROUND

Users frequently download new applications and associated application bundles onto their computing devices. Unfortunately, some application bundles may pose security and privacy risks to users, often due to using vulnerable third-party frameworks or having a poor transport security configuration that can be exploited by attackers. Examples of such exploitable vulnerabilities include "Zipperdown" (where attackers exploit file-naming conventions in third-party ZIP libraries to manipulate file paths for malicious payloads) and unverified user authentication schemes (where attackers inject unverified user authorization tokens into an application through an application bundle and then use the same to associate a social media account with a third-party service without the user's approval).

Unfortunately, it is typically difficult for conventional security applications installed within sandboxed operating system environments (such as IOS) to identify application bundles that pose security risks due to the sandboxed nature of the operating system. For example, the operating system may have sandbox restrictions, which may prevent applications from obtaining information about the operating system or other applications. Because applications are prevented from accessing data about other applications, security applications may be unable to scan application bundles to determine if they pose a security or privacy risk for a computing device. The instant disclosure, therefore, identifies and addresses a need for systems and methods for identifying security risks posed by application bundles.

SUMMARY

As will be described in greater detail below, the instant disclosure describes various systems and methods for identifying security risks posed by application bundles.

In one example, a method for identifying security risks posed by application bundles may include (i) intercepting, using a VPN client of a computing device, network traffic of the computing device, wherein an operating system of the computing device restricts applications into a sandboxed environment, (ii) storing, on the computing device, a copy of at least a portion of the network traffic of the computing device within a sandbox associated with the VPN client, (iii) identifying, by analyzing the copy of at least the portion of the network traffic, an application bundle within the network traffic, (iv) determining, by analyzing the application bundle in the sandbox associated with the VPN client, that the application bundle poses a security risk, and (v) in response to determining that the application bundle poses a security risk, performing a security action to remedy the security risk.

In some examples, the security action may include generating and displaying, to a user of the computing device, a notification that identifies the security risk. The security action may include at least one of preventing the computing device from downloading the application bundle or deleting the application bundle from the computing device. Analyzing the copy of the network traffic may include (i) parsing the copy of the network traffic stored in the sandbox associated with the VPN client, (ii) extracting data associated with the application bundle from the copy of the network traffic, and (iii) analyzing the data associated with the application bundle using a security policy. In some examples, the method may include presenting, based on the data associated with the application bundle, a summary of potential risks associated with the application bundle. The data associated with the application bundle may include at least one of a domain name, a declared permission requested by the application bundle, a dynamically linked library, a security setting, or a declared reason for an application executing in a background of the computing device.

In some examples, the method may include identifying, based on a uniform resource locator, a download within the network traffic that is associated with the application bundle and storing the download in the sandbox associated with the VPN client.

In one example, a system for identifying security risks posed by application bundles may include a computing device comprising at least one physical processor and physical memory comprising computer-executable instructions. Executing the computer-executable instructions may cause the computing device to (i) intercept, using a VPN client of the computing device, network traffic of the computing device, wherein an operating system of the computing device restricts applications into a sandboxed environment, (ii) store, on the computing device, a copy of at least a portion of the network traffic of the computing device within a sandbox associated with the VPN client, (iii) identify, by analyzing the copy of at least the portion of the network traffic, an application bundle within the network traffic, (iv) determine, by analyzing the application bundle in the sandbox associated with the VPN client, that the application bundle poses a security risk, and (v) in response to determining that the application bundle poses a security risk, perform a security action to remedy the security risk.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept, using a VPN client of the computing device, network traffic of the computing device, wherein an operating system of the computing device restricts applications into a sandboxed environment, (ii) store, on the computing device, a copy of at least a portion of the network traffic of the computing device within a sandbox associated with the VPN client, (iii) identify, by analyzing the copy of at least the portion of the network traffic, an application bundle within the network traffic, (iv) determine, by analyzing the application bundle in the sandbox associated with the VPN client, that the application bundle poses a security risk, and (v) in response to determining that the application bundle poses a security risk, perform a security action to remedy the security risk.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to identifying security risks posed by application bundles, including by analyzing application bundles to detect possible security and/or privacy risks. Application bundles are a type of data bundle created by developers. An application bundle may be downloaded separately from an application and may store data that the application may require for operation. The application bundle may contain the application executable and any resources used by the application. Examples of the resource may include the application icon, images, localized content, and the like.

In some examples, application bundles may pose security and privacy risks on a mobile computing device by using vulnerable third-party frameworks or having a poor transport security configuration that may be exploited by an attacker. However, application bundles that pose a security or privacy risk may be difficult to identify due to sandbox restrictions of an operating system, which may prevent applications from obtaining information about the operating system or other applications. The systems and methods described herein are directed to using a VPN client to intercept all network traffic of a computing device to, for example, bypass the sandbox restrictions of the closed operating system.

In one example, and as will be described in greater detail below, an application bundle may be identified within the intercepted network traffic and analyzed to determine whether the application bundle poses a security or privacy risk. In response to determining that the application bundle poses a risk, a security action may be performed to remedy the risk, such as deleting the application bundle or displaying a notification to the user identifying the possible security and/or privacy risks posed by the application bundle. As an additional security measure, analysis of the network traffic to identify and analyze the application bundles may be performed solely on the computing device without needing to offload any of the processing to a remote service.

Figure 1:
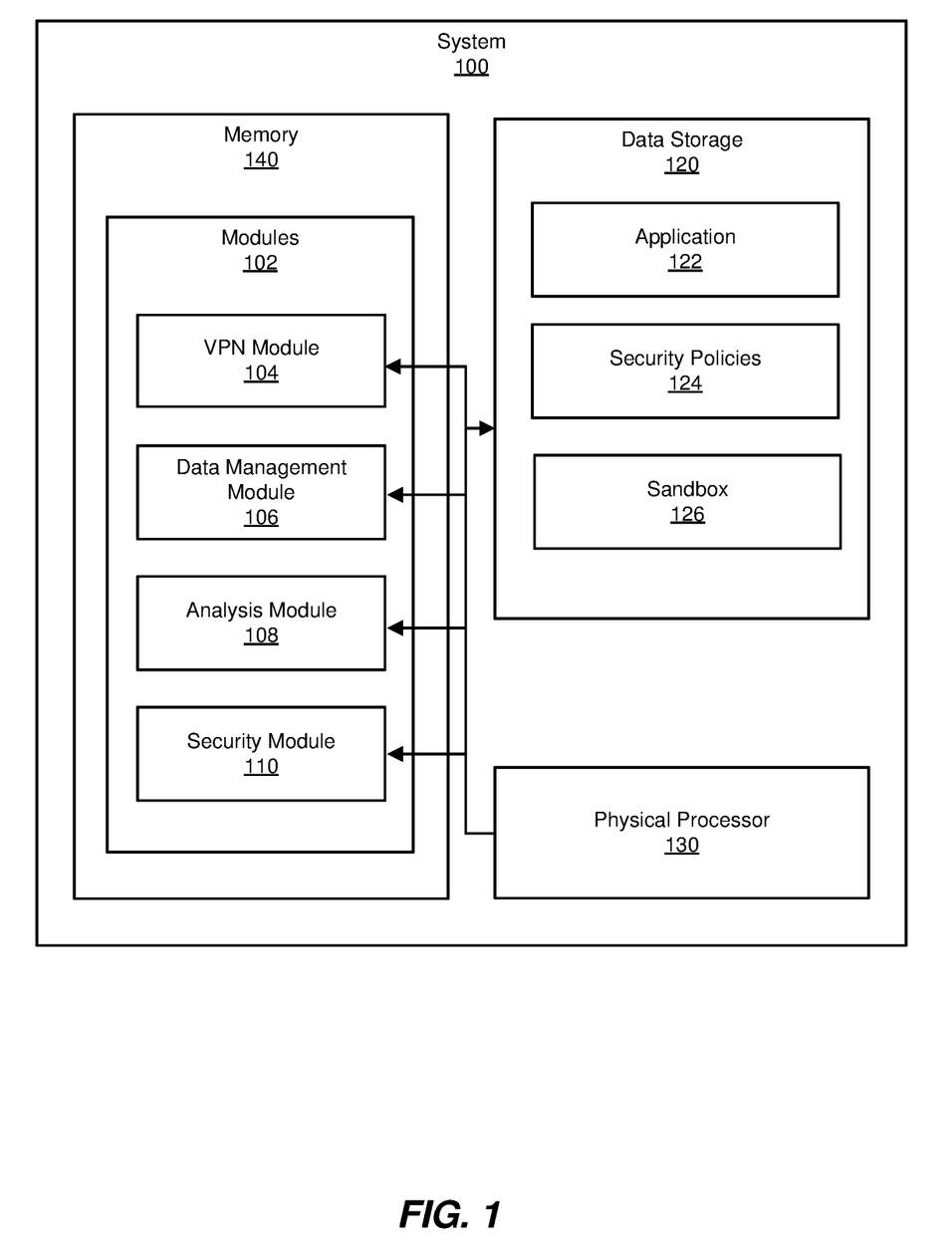
FIG. 1 is a block diagram of an example system for identifying security risks posed by application bundles.
Figure 2:
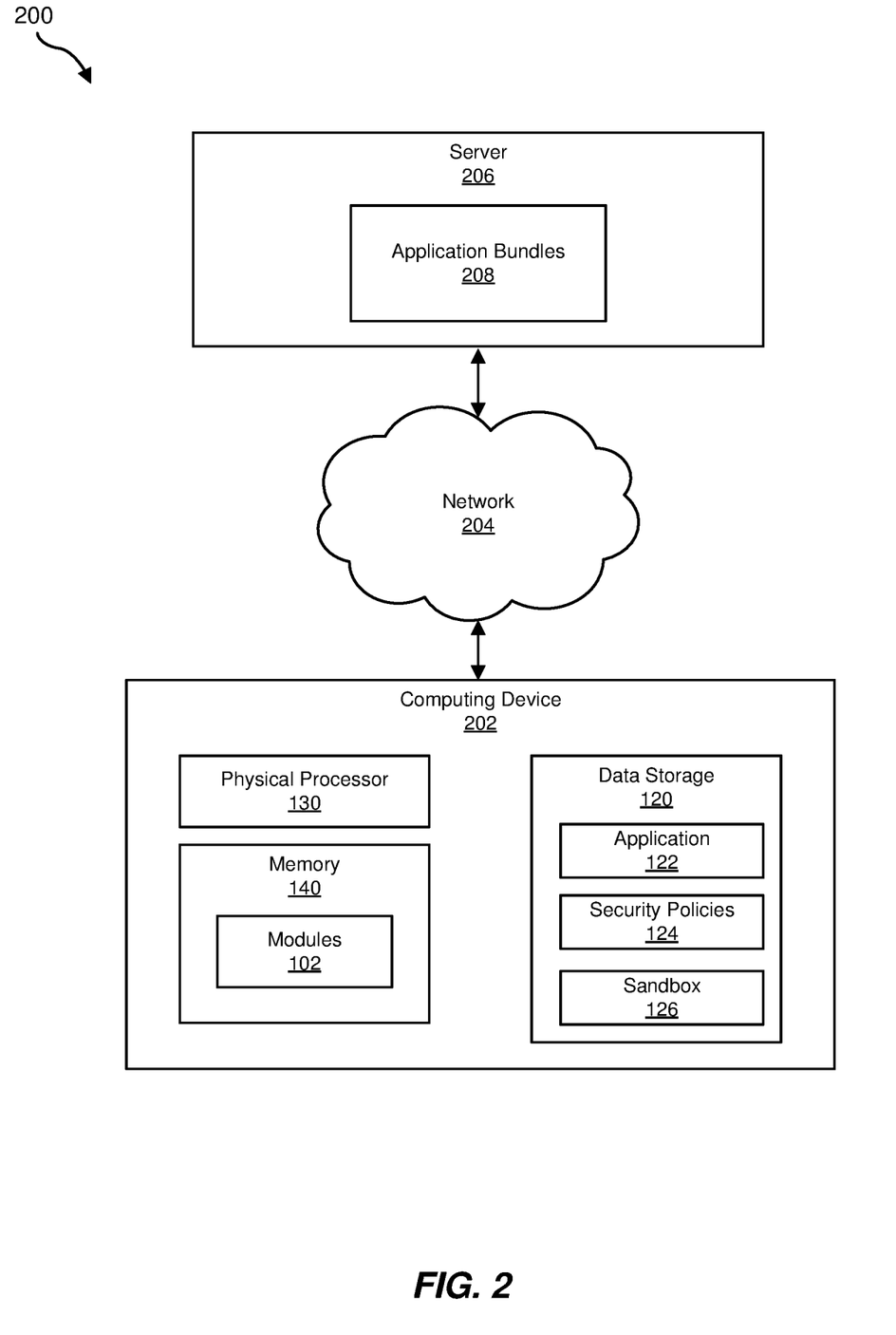
FIG. 2 is a block diagram of an additional example system for identifying security risks posed by application bundles.

The following will provide, with reference to FIGS. 1-2, detailed descriptions of example systems for identifying security risks posed by application bundles. Detailed descriptions of corresponding computer-implemented methods will also be provided in connection with FIG. 3. A detailed description of data flowing through the example system for identifying security risks posed by application bundles will also be provided in connection with FIG. 4. FIG. 5 is an example user interface depicting an example notification identifying security risks posed by application bundles. In addition, detailed descriptions of an example computing system and network architecture capable of implementing one or more of the embodiments described herein will be provided in connection with FIGS. 6-7, respectively.

FIG. 1 is a block diagram of an example system 100 for identifying security risks posed by application bundles. As illustrated in this figure, the example system 100 may include one or more modules 102 for performing one or more tasks. As will be explained in greater detail below, the modules 102 may include a virtual private network (VPN) module 104, a data management module 106, an analysis module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., the computing device 202 and/or the server 206). One or more of the modules 102 in FIG. 1 may also represent all or portions of one or more special-purpose computers configured to perform one or more tasks.

As illustrated in FIG. 1, the example system 100 may also include one or more memory devices, such as the memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, the example system 100 may also include one or more physical processors, such as the physical processor 130. The physical processor 130 generally represents any type or form of hardware-implemented processing unit capable of interpreting and/or executing computer-readable instructions. In one example, the physical processor 130 may access and/or modify one or more of the modules 102 stored in memory 140. Additionally, or alternatively, the physical processor 130 may execute one or more of the modules 102 to facilitate identifying security risks posed by application bundles. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, the example system 100 may also include the data storage 120. The data storage 120 generally represents any type or form of computing device capable of data storage. In one example, the data storage 120 may store an application 122, security policies 124, and/or a sandbox 126 associated with a VPN client.

The example system 100 in FIG. 1 may be implemented in a variety of ways. For example, all or a portion of the example system 100 may represent portions of the example system 200 in FIG. 2. As shown in FIG. 2, the system 200 may include a computing device 202 in communication with a server 206 via a network 204. In one example, all or a portion of the functionality of the modules 102 may be performed by the computing device 202, server 206, and/or any other suitable computing system. As will be described in greater detail below, one or more of the modules 102 from FIG. 1 may, when executed by at least one processor of the computing device 202 and/or the server 206, enable the computing device 202 and/or the server 206 for identifying harmful application bundles on mobile devices.

The computing device 202 generally represents any type or form of computing device capable of reading computer-executable instructions. For example, the computing device 202 may include an endpoint device (e.g., a mobile computing device) running one or more applications. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device that is capable of reading computer-executable instructions and data storage. In one example, the server 206 may include an endpoint executing an application distribution platform, which may distribute application bundles 208 to computing devices 202. Additional examples of the server 206 include, without limitation, security servers, application servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the server 206. In this example, the network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to the system 100 in FIG. 1 and/or the system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. The systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
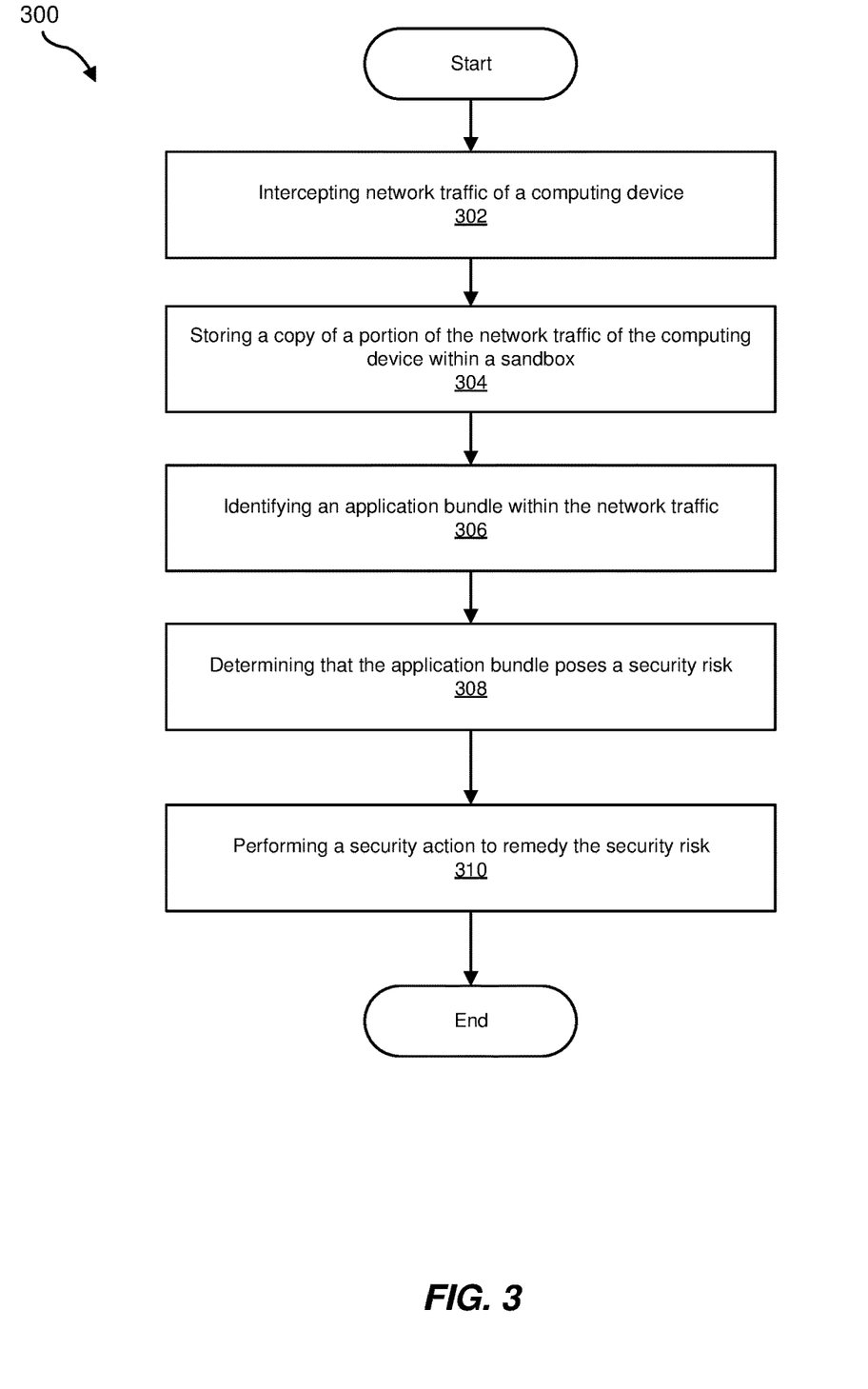
FIG. 3 is a flow diagram of an example method for identifying security risks posed by application bundles.

FIG. 3 is a flow diagram of an example computer-implemented method 300 for synchronous volume replication in a volume replication system. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may intercept network traffic of a computing device 202. The systems described herein may perform step 302 in any suitable manner. For example, the VPN module 104 may, as part of computing device 202 in FIG. 2, direct a VPN client to intercept network traffic of a computing device 202. In some examples, the operating system of the computing device 202 may restrict applications into a sandboxed environment. The VPN client may be used to intercept and inspect network traffic of the computing device 202 to bypass the sandboxed environment of an operating system of the computing device.

As used herein, the term "sandboxed environment" generally refers to a computing environment in which applications are isolated and restricted from accessing or obtaining information from the operating system of a computing device or other applications installed on the computing device. The sandboxed environment may prevent applications from accessing data or resources of the operating system or of other applications of the computing device 202.

The VPN module 104 may intercept any incoming or outgoing network traffic of the computing device 202. In some examples, the VPN module 104 may install a VPN client, which the VPN module 104 may direct to intercept any incoming or outgoing network traffic of the computing device 202. In some examples, the VPN module 104 may direct an existing VPN client to intercept the incoming or outgoing network traffic of the computing device 202.

At step 304, one or more of the systems described herein may store a copy of a portion of the network traffic of the computing device in a sandbox. The systems described herein may perform step 304 in any suitable manner. For example, the data management module 106 may, as part of the system 200 in FIG. 2, store a copy of at least a portion of the network traffic of the computing device 202 within the sandbox 126 associated with the VPN client.

The term "sandbox" as used herein, generally refers to limited area of storage space on a computer system that isolates applications and application data from other applications and other application data. The sandbox may wrap, surround, encapsulate, monitor, and/or manage an underlying application or data. The sandbox may provide an extra layer of security that prevents harmful applications (e.g., malware) or harmful applications from negatively affecting the computer system.

In some examples, the VPN module 104 may transmit the network traffic intercepted by the VPN client to the data management module 106. The data management module 106 may scan the intercepted network traffic and may identify a uniform resource locator (URL) within the network traffic. The data management module 106 may store a copy of a portion of the network traffic containing the URL. In some example, the portion of the network traffic stored to the sandbox 126 may be determined based on a rule indicating that the portion of the traffic to be stored should include a set number of characters or words before and/or after the identified URL. In some examples, the data management module 106 may compare the URL identified in the network traffic to a safe list of URLs. In response to determining that the URL is not on the safe list, the data management module 106 may store a copy of the network traffic containing the URL to the sandbox 126 associated with the VPN client.

At step 306, one or more of the systems described herein may identify an application bundle within the network traffic. The systems described herein may perform step 306 in any suitable manner. For example, the analysis module 108, may analyze the copy of the portion of the network traffic stored in the sandbox 126 to identify an application bundle 208.

In some examples, the data management module 106 may parse the copy of the network traffic stored in the sandbox 126 associated with the VPN client. The data management module 106 may parse the copy of the network traffic and identify the URL in the copy of the network traffic. The data management module 106 may identify a download associated with an application bundle 208. For example, the data management module 106 may obtain a download using the URL and may determine that the download is an application bundle 208 associated with an application of the computing device 202. The data management module 106 may use metadata associated with the download to determine that it is an application bundle 208 and may further compare the metadata of the application bundle 208 to the applications of the computing device 202 to determine it is associated with an existing application. The data management module 106 may store the download in the sandbox 126 associated with the VPN client.

In some examples, the analysis module 108 may extract data associated with the application bundle 208 from the copy of the network traffic or the download stored in the sandbox 126 associated with the VPN client. Example of the extracted data associated with the application bundle 208 may include a domain name, a declared permission requested by the application bundle 208, a dynamically linked library, a security setting, or a declared reason for an application executing in a background of the computing device 202. The extracted data may be analyzed using one or more security policies 124 stored on the computing device 202.

In some examples, a domain name in an application bundle 208 may pose a security risk because it may be used to direct the computing device 202 to an unsecure service or server which may attempt to obtain private or sensitive information from the computing device 202. In some examples declared permissions requested by the application bundle 208 may pose security and/or privacy risks by permitting an application to obtain sensitive or personally identifying information from the computing device 202, which may be transmitted to an unsecure or risk-prone service or server. Declared permissions in an application bundle 208 may identify devices of the computing device 202 which may be initiated or used by an application to collect data, such as a camera, microphone, Bluetooth peripheral devices, GPS device, motion sensor, NFC sensor, health monitoring sensors, or the like. Additionally, the declared permissions may request that an application be permitted to access information, such as the contacts stored on the computing device 202, calendar data, reminder data, photographs, recordings, or the like.

Another example of extracted data may include declared reasons for which an application is executing in the background of the computing device 202. The declared reasons may indicate that the application is pushing silent push notifications or fetching new content. The push notifications may include sensitive or personally identifying information and may be transmitted without the knowledge or permission of the user. The new content fetched by an application may include malware, spyware, or other type of detrimental software.

Other examples of data extracted from the network traffic that may indicate potential security or privacy risks may include dynamically linked libraries and/or security settings. The dynamically linked libraries listed in an application bundle 208 may include analytics engines, vulnerable open source libraries, and the like, which may enable an attacker to access information of the computing device 202 or otherwise infiltrate or harm the computing device 202. The security settings may include application transport security policies, which may be set to permit network connections to be downgraded and thus vulnerable to attackers.

At step 308, one or more of the systems described herein may determine that the application bundle poses a security risk. The systems described herein may perform step 308 in any suitable manner. For example, the analysis module 108 may use one or more security policies 124 to determine whether the application poses a security or privacy risk. The security policy 124 may identify one or more thresholds, permissions, security settings, dynamically linked libraries, or the like, that are associated with security and/or privacy risks. The analysis module 108 may apply the security policies 124 to the extracted data associated with the application bundle 208 to determine whether the application bundle 208 is a security and/or privacy risk. The security policies 124 may be stored locally on the computing device 202.

At step 310, one or more of the systems described herein may perform a security action to remedy the security risk. The systems described herein may perform step 310 in any suitable manner. For example, the security module 110 may receive an indication from the analysis module 108 that the identified application bundle 208 poses a security and/or privacy risk. The security module 110, in response to a determination that the application bundle 208 poses a security risk, may perform a security action to remedy the risk. Examples of the security action may include preventing the computing device 202 from downloading the application bundle 208 and/or deleting the application bundle 208 from the computing device 202.

In some examples, the security module 110 may generate and display a notification that identifies the security and/or privacy risks posed by the application bundle 208. The notification may be a summary of potential risks associated with the application bundle 208 based on the analyzed data associated with the application bundle 208. In some examples, the notification may include a recommended course of action to remedy the possible security risk. For example, the recommendation may be do delete the application bundle 208 from the computing device 202. The notification may include a link or button asking the user to confirm or ignore the recommended course of action. The security module 110 may receive an indication from the user to delete the identified application bundle 208 via the link or button displayed in the notification. The security module 110, in response to receiving the indication, may delete the application bundle 208 from the computing device 202. In some examples, the recommended course of action displayed in the notification may include detailed instructions informing the user how to manually remove the identified application bundle 208.

Figure 4:
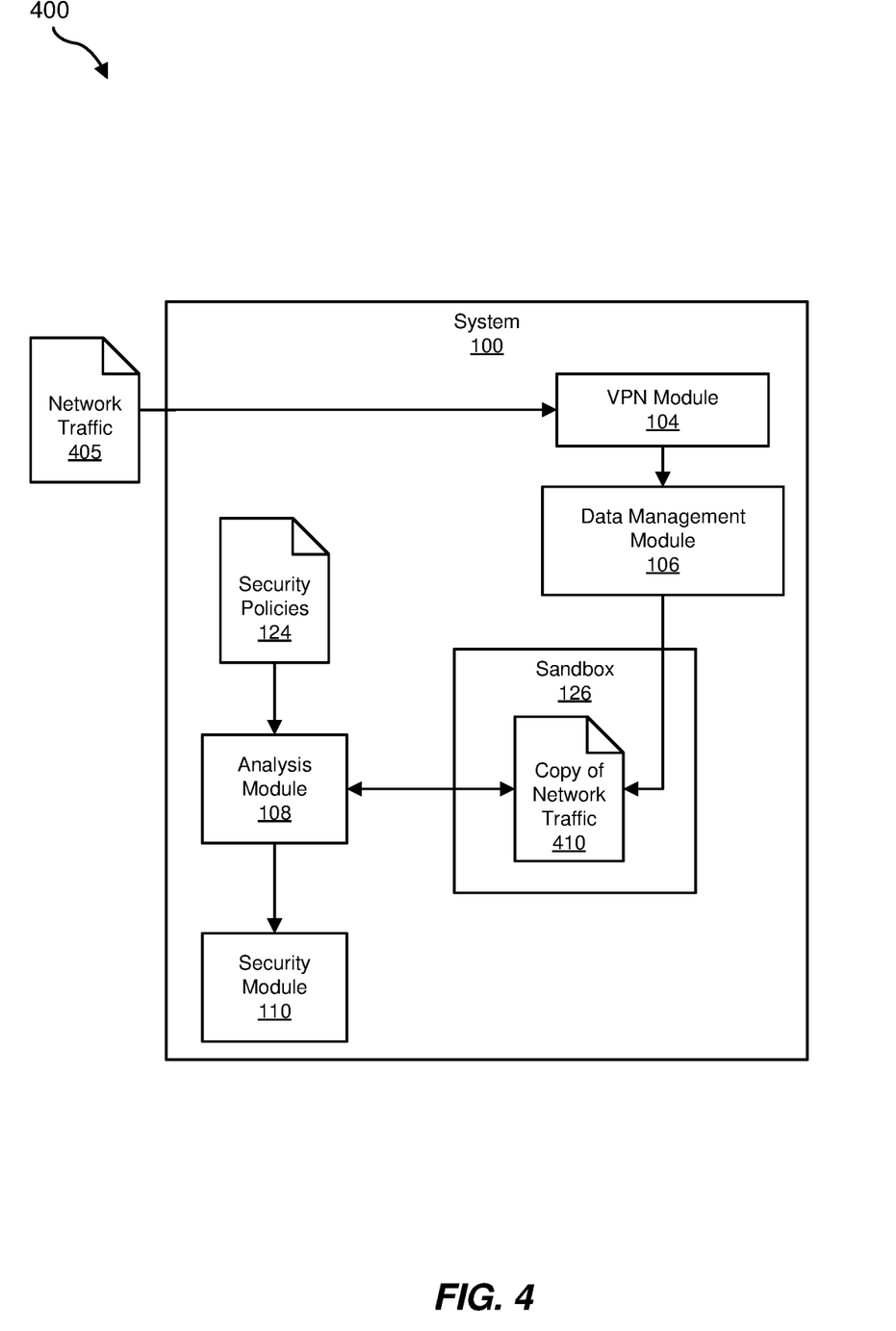
FIG. 4 is a data flow diagram of an example system for identifying security risks posed by application bundles.
Figure 5:
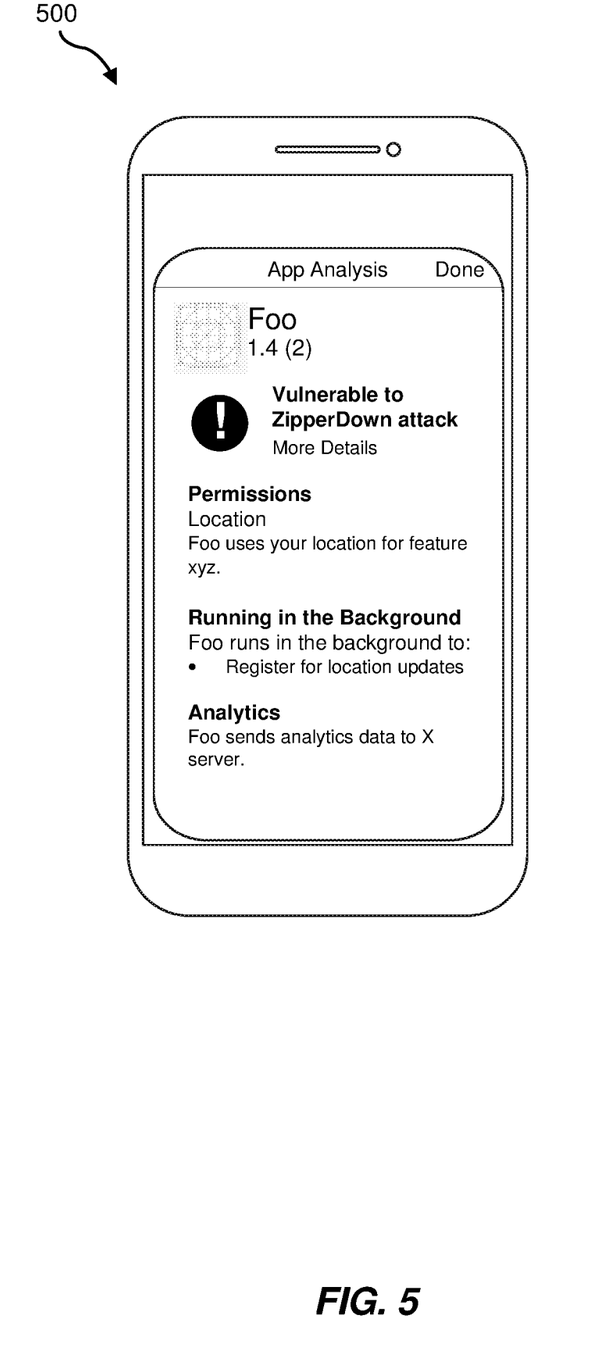
FIG. 5 is an example user interface depicting an example notification identifying security risks posed by application bundles.

FIG. 4 is a data flow diagram of an example system 400 for identifying security risks posed by application bundles. The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of the computing device 202 or the server 206, enable the system 400 to identify security or privacy risks posed by an identified application bundle 208. For example, and as will be described in greater detail herein, one or more of the modules 102 may cause the example system 400 to intercept, by a VPN client of the VPN module 104, network traffic 405 for a computing device 202. The VPN module 104 may identify a download within the network traffic 405 that is associated with an application bundle 208. The data management module 106 may store a copy of the network traffic containing the download into a sandbox 126 associated with the VPN client. The analysis module 108 may analyze the stored copy of the network traffic 410 in the sandbox 126 and extract data associated with an application bundle 208. Based on the extracted data and one or more security policies 124, the analysis module 108 may determine that the identified application bundle 208 poses a security and/or privacy risk. Based on the analysis, the security module 110 may perform one or more security actions to remedy the security risk. Examples of the security action may include preventing the download from completing and/or deleting the application bundle 208.

FIG. 5 is an example user interface depicting an example notification 500 identifying security risks posed by application bundles. In some examples, in response to analyzing network traffic and data associated with an identified application bundle 208, the security module 110 may generate a notification or otherwise present information associated with potential security risks associated with the identified application bundle 208 to a user. For example, the notification may display an indication of a type of security or privacy vulnerability identified to be associated with the application bundle 208, such as a ZipperDown attack. The notification may present a link for the user to select if they wish to obtain additional details about the identified security or privacy risk. The notification may display additional information, such as permission settings detected in the application bundle 208. For example, an application bundle 208 may include a security setting that permits the location of the device to be shared. The notification may display a reason for the permission setting, which may be included in the application bundle 208. Additionally, the notification may determine that the application associated with the application bundle 208 may execute in the background of the mobile device and may include a reason for the background execution. The notification may also determine that the application associated with the application bundle 208 may transmit data from the application to another device.

The systems and methods described herein are directed to providing identifying and remedying application bundles that pose a security and/or privacy risk. Application bundles may pose security and privacy risks on a mobile computing device by using vulnerable third-party frameworks or having a poor transport security configuration that may be exploited by an attacker. However, application bundles that pose a security or privacy risk may be difficult to identify due to sandbox restrictions of an operating system, which may prevent applications from obtaining information about the operating system or other applications. The systems and methods described herein are directed to using a VPN client to intercept all network traffic of a computing device, identifying an application bundle within the network traffic, and analyzing the identified application bundle to determine whether the application bundle poses a security or privacy risk. In response to determining that the application bundle poses a risk, a security action may be performed to remedy the risk.

Figure 6:
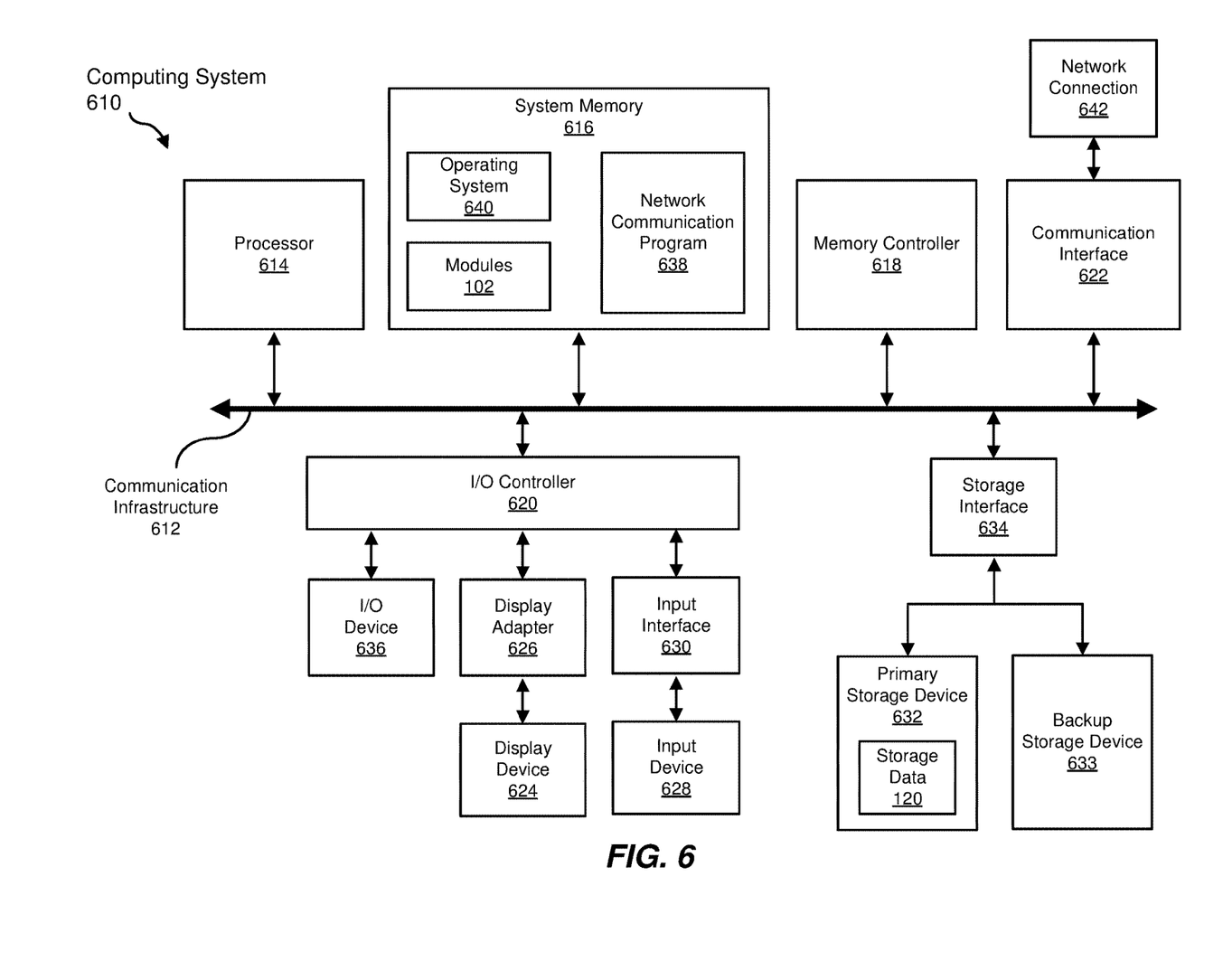
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of the computing system 610 may perform and/or be a means for performing, either alone or in combination with other elements, one or more of the steps described herein (such as one or more of the steps illustrated in FIGS. 3-6). All or a portion of the computing system 610 may also perform and/or be a means for performing any other steps, methods, or processes described and/or illustrated herein.

The computing system 610 broadly represents any single or multi-processor computing device or system capable of executing computer-readable instructions. Examples of the computing system 610 include, without limitation, workstations, laptops, client-side terminals, servers, distributed computing systems, handheld devices, or any other computing system or device. In its most basic configuration, the computing system 610 may include at least one processor 614 and a system memory 616.

The processor 614 generally represents any type or form of physical processing unit (e.g., a hardware-implemented central processing unit) capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of the system memory 616 include, without limitation, Random Access Memory (RAM), Read Only Memory (ROM), flash memory, or any other suitable memory device. Although not required, in certain embodiments the computing system 610 may include both a volatile memory unit (such as, for example, the system memory 616) and a non-volatile storage device (such as, for example, the primary storage device 632, as described in detail below). In one example, one or more of the modules 102 from FIG. 1 may be loaded into the system memory 616.

In some examples, the system memory 616 may store and/or load an operating system 640 for execution by the processor 614. In one example, the operating system 640 may include and/or represent software that manages computer hardware and software resources and/or provides common services to computer programs and/or applications on the computing system 610. Examples of the operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 610 may also include one or more components or elements in addition to the processor 614 and the system memory 616. For example, as illustrated in FIG. 6, the computing system 610 may include a memory controller 618, an Input/Output (I/O) controller 620, and a communication interface 622, each of which may be interconnected via a communication infrastructure 612. The communication infrastructure 612 generally represents any type or form of infrastructure capable of facilitating communication between one or more components of a computing device. Examples of the communication infrastructure 612 include, without limitation, a communication bus (such as an Industry Standard Architecture (ISA), Peripheral Component Interconnect (PCI), PCI Express (PCIe), or similar bus) and a network.

The memory controller 618 generally represents any type or form of device capable of handling memory or data or controlling communication between one or more components of the computing system 610. For example, in certain embodiments, the memory controller 618 may control communication between the processor 614, the system memory 616, and the I/O controller 620 via the communication infrastructure 612.

The I/O controller 620 generally represents any type or form of module capable of coordinating and/or controlling the input and output functions of a computing device. For example, in certain embodiments, the I/O controller 620 may control or facilitate transfer of data between one or more elements of the computing system 610, such as the processor 614, the system memory 616, the communication interface 622, the display adapter 626, the input interface 630, and the storage interface 634.

As illustrated in FIG. 6, the computing system 610 may also include at least one display device 624 coupled to the I/O controller 620 via a display adapter 626. The display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6, the example computing system 610 may also include at least one input device 628 coupled to I/O controller 620 via an input interface 630. Input device 628 generally represents any type or form of input device capable of providing input, either computer or human generated, to the example computing system 610. Examples of the input device 628 include, without limitation, a keyboard, a pointing device, a speech recognition device, variations or combinations of one or more of the same, and/or any other input device.

Additionally, or alternatively, the example computing system 610 may include additional I/O devices. For example, the example computing system 610 may include the I/O device 636. In this example, the I/O device 636 may include and/or represent a user interface that facilitates human interaction with the computing system 610. Examples of the I/O device 636 include, without limitation, a computer mouse, a keyboard, a monitor, a printer, a modem, a camera, a scanner, a microphone, a touchscreen device, variations or combinations of one or more of the same, and/or any other I/O device.

The communication interface 622 broadly represents any type or form of communication device or adapter capable of facilitating communication between the example computing system 610 and one or more additional devices. For example, in certain embodiments, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In at least one example, the communication interface 622 may provide a direct connection to a remote storage device via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 622 may also represent a host adapter configured to facilitate communication between the computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 622 may also allow the computing system 610 to engage in distributed or remote computing. For example, the communication interface 622 may receive instructions from a remote device or send instructions to a remote device for execution.

In some examples, the system memory 616 may store and/or load a network communication program 638 for execution by the processor 614. In one example, the network communication program 638 may include and/or represent software that enables the computing system 610 to establish a network connection 642 with another computing system (not illustrated in FIG. 6) and/or communicate with the other computing system by way of the communication interface 622. In this example, the network communication program 638 may direct the flow of outgoing traffic that is sent to the other computing system via the network connection 642. Additionally, or alternatively, the network communication program 638 may direct the processing of incoming traffic that is received from the other computing system via the network connection 642 in connection with the processor 614.

Although not illustrated in this way in FIG. 6, the network communication program 638 may alternatively be stored and/or loaded in the communication interface 622. For example, the network communication program 638 may include and/or represent at least a portion of software and/or firmware that is executed by a processor and/or Application Specific Integrated Circuit (ASIC) incorporated in the communication interface 622.

As illustrated in FIG. 6, the example computing system 610 may also include a primary storage device 632 and a backup storage device 633 coupled to the communication infrastructure 612 via a storage interface 634. The storage devices 632 and 633 generally represent any type or form of storage device or medium capable of storing data and/or other computer-readable instructions. For example, the storage devices 632 and 633 may be a magnetic disk drive (e.g., a so-called hard drive), a solid state drive, a floppy disk drive, a magnetic tape drive, an optical disk drive, a flash drive, or the like. The storage interface 634 generally represents any type or form of interface or device for transferring data between the storage devices 632 and 633 and other components of the computing system 610. In one example, the application 122 and security policies 124 from FIG. 1 may be stored and/or loaded in the primary storage device 632.

In certain embodiments, the storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 632 and 633 may also include other similar structures or devices for allowing computer software, data, or other computer-readable instructions to be loaded into the computing system 610. For example, the storage devices 632 and 633 may be configured to read and write software, data, or other computer-readable information. The storage devices 632 and 633 may also be a part of the computing system 610 or may be a separate device accessed through other interface systems.

Many other devices or subsystems may be connected to the computing system 610. Conversely, all of the components and devices illustrated in FIG. 6 need not be present to practice the embodiments described and/or illustrated herein. The devices and subsystems referenced above may also be interconnected in different ways from that shown in FIG. 6. The computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 610. All or a portion of the computer program stored on the computer-readable medium may then be stored in the system memory 616 and/or various portions of the storage devices 632 and 633. When executed by the processor 614, a computer program loaded into the computing system 610 may cause the processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 610 may be configured as an Application Specific Integrated Circuit (ASIC) adapted to implement one or more of the example embodiments disclosed herein.

Figure 7:
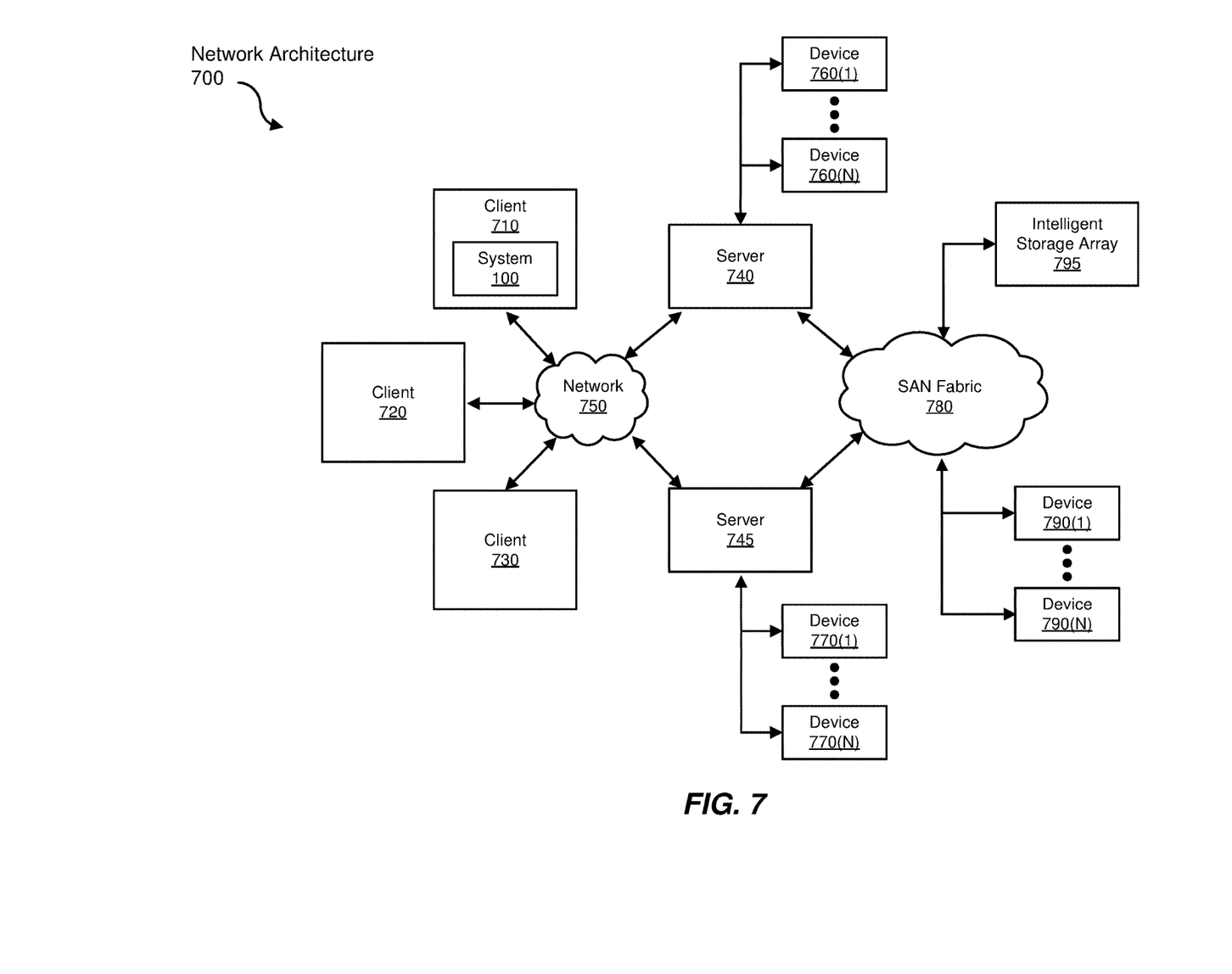
FIG. 7 is a block diagram of an example computing network capable of implementing one or more of the embodiments described and/or illustrated herein.

FIG. 7 is a block diagram of an example network architecture 700 in which the client systems 710, 720, and 730 and the servers 740 and 745 may be coupled to a network 750. As detailed above, all or a portion of the network architecture 700 may perform and/or be a means for performing, either alone or in combination with other elements, one or more of the steps disclosed herein (such as one or more of the steps illustrated in FIGS. 3-6). All or a portion of the network architecture 700 may also be used to perform and/or be a means for performing other steps and features set forth in the instant disclosure.

The client systems 710, 720, and 730 generally represent any type or form of computing device or system, such as the example computing system 610 in FIG. 6. Similarly, the servers 740 and 745 generally represent computing devices or systems, such as application servers or database servers, configured to provide various database services and/or run certain software applications. The network 750 generally represents any telecommunication or computer network including, for example, an intranet, a WAN, a LAN, a PAN, or the Internet. In one example, the client systems 710, 720, and/or 730 and/or the servers 740 and/or 745 may include all or a portion of the system 100 from FIG. 1.

As illustrated in FIG. 7, the one or more storage devices 760(1)-(N) may be directly attached to the server 740. Similarly, the one or more storage devices 770(1)-(N) may be directly attached to the server 745. The storage devices 760(1)-(N) and the storage devices 770(1)-(N) generally represent any type or form of storage device or medium capable of storing data and/or other computer-readable instructions. In certain embodiments, the storage devices 760(1)-(N) and the storage devices 770(1)-(N) may represent Network-Attached Storage (NAS) devices configured to communicate with the servers 740 and 745 using various protocols, such as Network File System (NFS), Server Message Block (SMB), or Common Internet File System (CIFS).

The servers 740 and 745 may also be connected to a Storage Area Network (SAN) fabric 780. The SAN fabric 780 generally represents any type or form of computer network or architecture capable of facilitating communication between a plurality of the storage devices. The SAN fabric 780 may facilitate communication between the servers 740 and 745 and a plurality of the storage devices 790(1)-(N) and/or an intelligent storage array 795. The SAN fabric 780 may also facilitate, via the network 750 and the servers 740 and 745, communication between the client systems 710, 720, and 730 and the storage devices 790(1)-(N) or the intelligent storage array 795 in such a manner that the devices 790(1)-(N) and the array 795 appear as locally attached devices to the client systems 710, 720, and 730. As with the storage devices 760(1)-(N) and the storage devices 770(1)-(N), the storage devices 790(1)-(N) and the intelligent storage array 795 generally represent any type or form of storage device or medium capable of storing data and/or other computer-readable instructions.

In certain embodiments, and with reference to the example computing system 610 of FIG. 6, a communication interface, such as the communication interface 622 in FIG. 6, may be used to provide connectivity between each client system 710, 720, and 730 and the network 750. The client systems 710, 720, and 730 may be able to access information on the server 740 or 745 using, for example, a web browser or other client software. Such software may allow the client systems 710, 720, and 730 to access data hosted by the server 740, the server 745, the storage devices 760(1)-(N), the storage devices 770(1)-(N), the storage devices 790(1)-(N), or the intelligent storage array 795. Although FIG. 7 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by the server 740, the server 745, the storage devices 760(1)-(N), the storage devices 770(1)-(N), the storage devices 790(1)-(N), the intelligent storage array 795, or any combination thereof. All or a portion of one or more of the example embodiments disclosed herein may also be encoded as a computer program, stored in the server 740, run by the server 745, and distributed to the client systems 710, 720, and 730 over the network 750.

As detailed above, the computing system 610 and/or one or more components of the network architecture 700 may perform and/or be a means for performing, either alone or in combination with other elements, one or more steps of an example method for identifying security risks posed by application bundles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. The cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying security risks posed by application bundles, at least a portion of the method being performed by a computing device comprising at least one processor, the method comprising:
   intercepting, using a VPN client of the computing device, all network traffic of the computing device, wherein an operating system of the computing device restricts applications into a sandboxed environment;
   identifying, based on identifying a uniform resource locator (URL) within the network traffic, a download within the network traffic that is associated with the application bundle;
   determining a portion of the network traffic to be stored on the computing device based on a rule indicating that the portion should include a set number of at least one of characters or words at least one of before or after the identified URL;
   storing, on the computing device in response to identifying the URL, a copy of at least portion of the network traffic of the computing device within a sandbox associated with the VPN client;
   identifying, by analyzing the copy of at least the portion of the network traffic, an application bundle within the network traffic;
   determining, by analyzing the application bundle in the sandbox associated with the VPN client, that the application bundle poses a security risk; and
   in response to determining that the application bundle poses a security risk, performing a security action to remedy the security risk.

2. The computer-implemented method of claim 1, wherein the security action comprises generating and displaying, to a user of the computing device, a notification that identifies the security risk.

3. The computer-implemented method of claim 1, wherein the security action comprises at least one of:
   preventing the computing device from downloading the application bundle; or
   deleting the application bundle from the computing device.

4. The computer-implemented method of claim 1, wherein analyzing the copy of the network traffic comprises:
   parsing the copy of the network traffic stored in the sandbox associated with the VPN client;
   extracting data associated with the application bundle from the copy of the network traffic; and
   analyzing the data associated with the application bundle using a security policy.

5. The computer-implemented method of claim 4, wherein the data associated with the application bundle includes at least one of a domain name, a declared permission requested by the application bundle, a dynamically linked library, a security setting, or a declared reason for an application executing in a background of the computing device.

6. The computer-implemented method of claim 4, further comprising presenting, based on the data associated with the application bundle, a summary of potential risks associated with the application bundle.

7. The computer-implemented method of claim 1, wherein storing the copy within the sandbox associated with the VPN client occurs directly in response to identifying the URL.

8. A system for identifying security risks posed by application bundles, the system comprising:
- a computing device comprising at least one physical processor; and
- physical memory comprising computer-executable instructions that, when executed by the at least one physical processor, cause the computing device to:
  - intercept, using a VPN client of the computing device, all network traffic of the computing device, wherein an operating system of the computing device restricts applications into a sandboxed environment;
  - identify, based on identifying a uniform resource locator (URL) within the network traffic, a download within the network traffic that is associated with the application bundle;
  - determine a portion of the network traffic to be stored on the computing device based on a rule indicating that the portion should include a set number of at least one of characters or words at least one of before or after the identified URL;
  - store, on the computing device in response to identifying the URL, a copy of at least portion of the network traffic of the computing device within a sandbox associated with the VPN client;
  - identify, by analyzing the copy of at least the portion of the network traffic, an application bundle within the network traffic;
  - determine, by analyzing the application bundle in the sandbox associated with the VPN client, that the application bundle poses a security risk; and
  - in response to determining that the application bundle poses a security risk, perform a security action to remedy the security risk.

9. The system of claim 8, wherein the security action comprises generating and displaying, to a user of the computing device, a notification that identifies the security risk.

10. The system of claim 8, wherein the security action comprises at least one of:
- preventing the computing device from downloading the application bundle; or
- deleting the application bundle from the computing device.

11. The system of claim 8, wherein, to analyze the copy of the network traffic, the computer-executable instructions further cause the computing device to:
- parse the copy of the network traffic stored in the sandbox associated with the VPN client;
- extract data associated with the application bundle from the copy of the network traffic; and analyze the data associated with the application bundle using a security policy.

12. The system of claim 11, wherein the data associated with the application bundle includes at least one of a domain name, a declared permission requested by the application bundle, a dynamically linked library, a security setting, or a declared reason for an application executing in a background of the computing device.

13. The system of claim 11, wherein the computer-executable instructions further cause the computing device to present, based on the data associated with the application bundle, a summary of potential risks associated with the application bundle.

14. The system of claim 8, wherein the computer-executable instructions cause the computing device to store the copy within the sandbox associated with the VPN client directly in response to identifying the URL.

15. A non-transitory computer-readable medium comprising one or more computer-executable instructions that, when executed by at least one processor of a computing device, cause the computing device to:
- intercept, using a VPN client of the computing device, all network traffic of the computing device, wherein an operating system of the computing device restricts applications into a sandboxed environment;
- identify, based on identifying a uniform resource locator (URL) within the network traffic, a download within the network traffic that is associated with the application bundle;
- determine a portion of the network traffic to be stored on the computing device based on a rule indicating that the portion should include a set number of at least one of characters or words at least one of before or after the identified URL;
- store, on the computing device in response to identifying the URL, a copy of at least portion of the network traffic of the computing device within a sandbox associated with the VPN client;
- identify, by analyzing the copy of at least the portion of the network traffic, an application bundle within the network traffic;
- determine, by analyzing the application bundle in the sandbox associated with the VPN client, that the application bundle poses a security risk; and
- in response to determining that the application bundle poses a security risk, perform a security action to remedy the security risk.

16. The non-transitory computer-readable medium of claim 15, wherein the security action comprises generating and displaying, to a user of the computing device, a notification that identifies the security risk.

17. The non-transitory computer-readable medium of claim 15, wherein the security action comprises at least one of:
- preventing the computing device from downloading the application bundle; or
- deleting the application bundle from the computing device.

18. The non-transitory computer-readable medium of claim 15, wherein, to analyze the copy of the network traffic, the computer-executable instructions further cause the computing device to:
- parse the copy of the network traffic stored in the sandbox associated with the VPN client;
- extract data associated with the application bundle from the copy of the network traffic; and
- analyze the data associated with the application bundle using a security policy.

19. The non-transitory computer-readable medium of claim 18, wherein the data associated with the application bundle includes at least one of a domain name, a declared permission requested by the application bundle, a dynamically linked library, a security setting, or a declared reason for an application executing in a background of the computing device.

20. The non-transitory computer-readable medium of claim 18, wherein the computer-executable instructions further cause the computing device to present, based on the data associated with the application bundle, a summary of potential risks associated with the application bundle.

* * * * *